United States Patent

Souissi et al.

[11] Patent Number: 5,850,605
[45] Date of Patent: Dec. 15, 1998

[54] METHOD AND APPARATUS FOR DYNAMICALLY GROUPING TRANSMITTERS FOR MESSAGE TRANSMISSION IN A COMMUNICATION SYSTEM

[75] Inventors: Slim Souissi, Fort Worth, Tex.; Samir A. Sawaya, San Diego, Calif.; Jheroen P. Dorenbosch, Waxahachie; Al Briancon, McKinney, both of Tex.

[73] Assignee: Motorola, Inc.

[21] Appl. No.: 740,935

[22] Filed: Nov. 5, 1996

[51] Int. Cl.⁶ .......................................... H04Q 9/00
[52] U.S. Cl. .................. 455/437; 455/11.1; 455/436; 455/445; 455/67.1; 455/452; 455/503; 455/575; 455/63; 455/67.3; 455/226.3; 370/313; 370/332
[58] Field of Search .................... 455/436, 437, 455/438, 439, 442, 445, 447, 11.1, 500, 517, 519, 452, 575, 503, 63, 67.3, 9, 67.1, 134, 135, 226.2, 226.3, 513; 370/342, 312, 313, 332

[56] References Cited

U.S. PATENT DOCUMENTS

| | | | |
|---|---|---|---|
| 5,175,867 | 12/1992 | Wejke et al. | 455/33.1 |
| 5,285,447 | 2/1994 | Hulsebosch | 455/33.2 |
| 5,381,443 | 1/1995 | Borth et al. | 455/33.1 |
| 5,493,563 | 2/1996 | Rozanski et al. | 455/33.2 |
| 5,499,387 | 3/1996 | Chambert | 455/33.2 |
| 5,517,675 | 5/1996 | O'Connor et al. | 455/33.2 |
| 5,701,585 | 12/1997 | Kallin et al. | 455/33.2 |

Primary Examiner—Donnie L. Crosland
Attorney, Agent, or Firm—Charles W. Bethards

[57] ABSTRACT

A communication system (100) for dynamically selecting transmitters (115) for message transmission includes the transmitters (115) for sending transmission signals and a portable messaging unit (105) for receiving the transmission signals, calculating signal strengths of the transmission signals, and transmitting a signal indicative of the signal strengths. A controller (110) receives the signal and determines therefrom carrier-to-interference (C/I) values indicative of relative strengths of the transmission signals received by the portable messaging unit (105). Prior to message delivery, the controller (110) determines a selected transmitter (115) for transmitting a message to the portable messaging unit (105). The selected transmitter (115) is associated with a lowest C/I value that is chosen from the C/I values and that exceeds a C/I threshold value.

22 Claims, 8 Drawing Sheets

5,850,605

METHOD AND APPARATUS FOR DYNAMICALLY GROUPING TRANSMITTERS FOR MESSAGE TRANSMISSION IN A COMMUNICATION SYSTEM

FIELD OF THE INVENTION

This invention relates in general to radio communications, and more specifically to communication systems in which transmitters are grouped into reuse groups.

BACKGROUND OF THE INVENTION

Conventional radio communication systems include transmitters for transmitting messages, portable messaging units (PMUs) for receiving the messages, and one or more controllers for controlling message delivery operations. In one such system, transmitters simulcast signals including identification codes, and the PMU selects a transmitter based on which signal is of sufficient strength to "capture" the receiver of the PMU and to be decoded correctly. The PMU subsequently transmits the identification code corresponding to the selected transmitter for reception by the controller. Messages intended for reception by the PMU are then forwarded to the selected transmitter for transmission thereby to the PMU.

However, previous reception of the identification code by the PMU does not ensure that the message transmitted by the selected transmitter will be received without errors by the PMU. Furthermore, the transmitter selected by the PMU may not even have the best signal quality with respect to message transmission to the PMU due to co-channel interference. Therefore, the quality of message delivery can be impacted, resulting in situations in which missed or erroneously received messages must be resent to the PMU.

Thus, what is needed is a way to optimize signal quality and efficiently utilize system resources.

DESCRIPTION OF A PREFERRED EMBODIMENT

Figure 1:
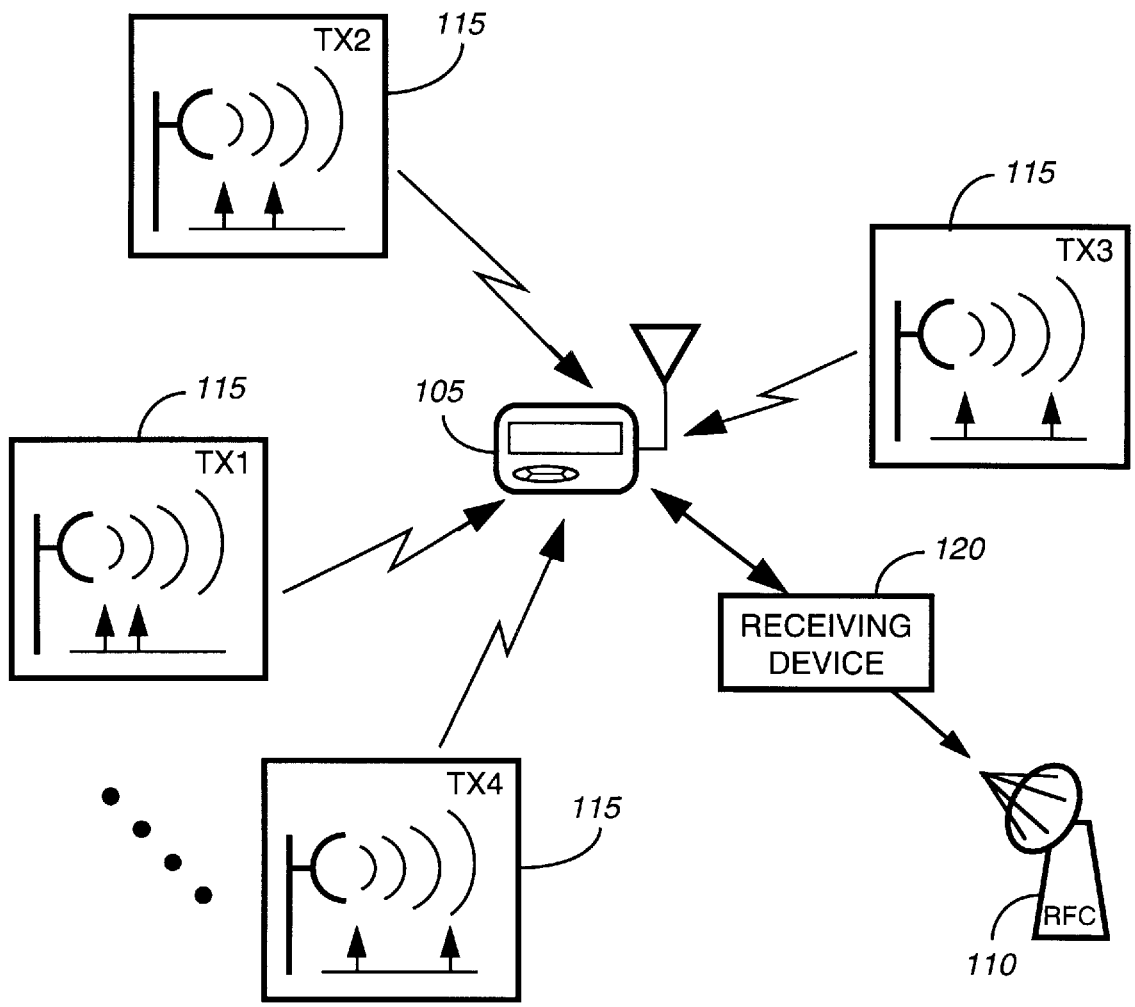
FIG. 1 is a diagram of a communication system for grouping transmitters into reuse groups according to carrier-to-interference (C/I) values associated with tones transmitted by the transmitters according to the present invention.

FIG. 1 illustrates a communication system 100 including one or more portable messaging units (PMUs) 105, such as radio transceivers, for receiving and transmitting radio signals. The communication system 100 further includes at least one radio frequency controller (RFC) 110 for controlling operations of the system 100. In particular, the RFC 110 receives data, such as messages, for transmission to a PMU 105. The RFC 110 receives the data from, for example, conventional telephones or modems over a telephone network (not shown). The messages are then provided by the RFC 110 to one or more transmitters 115 included in the system 100 for transmitting the messages as radio signals. A receiving device 120 receives communications from PMUs 105 and provides the communications to the RFC 110 over a communication link, such as a dedicated wireline or a wireless communication channel.

Figure 2:
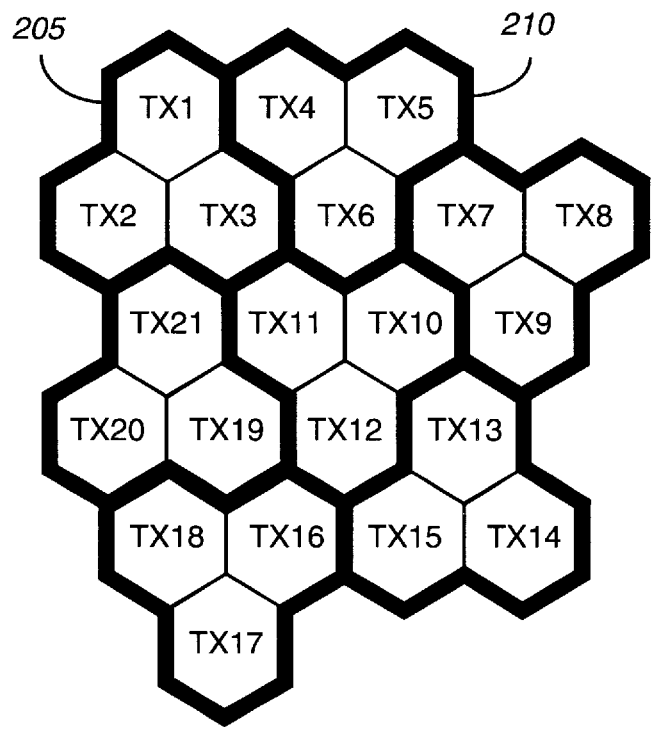
FIGS. 2 and 3 are diagrams of different reuse groups into which the transmitters of FIG. 1 can be grouped according to the present invention.
Figure 3:
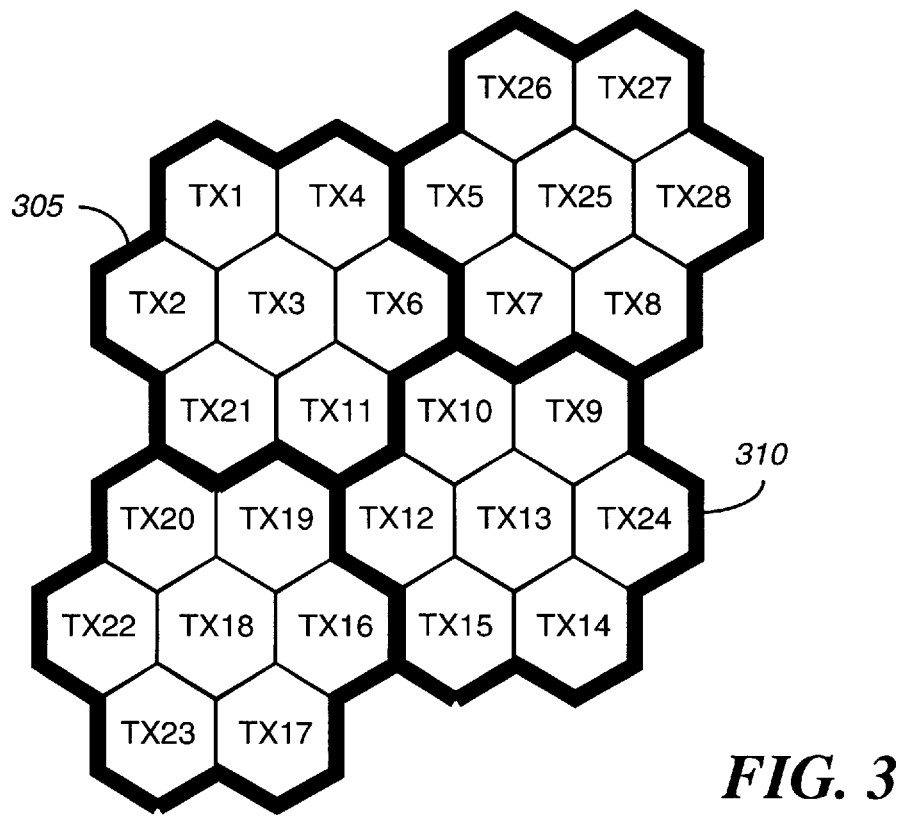

Referring next to FIGS. 2 and 3, possible arrangements of transmitters 115 within the system 100 are depicted. As shown, the communication system 100 comprises a plurality of cells grouped into clusters, each including a particular number of cells within which the transmitters 115 send radio signals. The illustration of FIG. 2 shows a three-cells-per-cluster 205, 210 arrangement, i.e., reuse groups according to a reuse factor of three, while the illustration of FIG. 3 shows a seven-cell-per-cluster 305, 310 arrangement, i.e., reuse groups according to a reuse factor of seven. Each cell comprises a pre-defined area including a transmission range of the associated transmitter 115, and cells are generally located at fixed distances from other cells. The distance between cells is determined by the cluster size and by the transmission range or ranges of the transmitters 115. It will be appreciated that, within any given reuse group, only one transmitter 115 at a time transmits over a particular communication channel, e.g., frequency. Other transmitters 115 could, for instance, be turned off or transmit on different channels.

Although FIGS. 2 and 3 depict fixed clusters of transmitters 115, the transmitters 115 included in each cluster can also be varied. For instance, referring to FIG. 2, the RFC 110 could group TX1, TX3, and TX4 into a three-cell cluster. Referring to FIG. 3, the RFC 110 could group TX3, TX4, TX5, TX6, TX7, TX10, and TX11 into a seven-cell cluster. This aspect of the present invention will be explained in greater detail below.

In accordance with the present invention, the transmitters 115 can be dynamically grouped into reuse groups including different numbers of transmitters 115 based upon information supplied to the RFC 110 by PMUs 105 within the system 100. Specifically, each transmitter 115 within the system 100 sends out a transmission signal at a reference frequency and a transmission signal at another frequency recognized by a PMU 105. Preferably, a signalling protocol such as the well-known FLEX™ protocol is used for message delivery, and the transmission signals are sent out by the transmitters 115 during predetermined times, such as during transmission of the "B" word of the synchronization code in selected or all frames of the radio signal. The PMU 105 receives the transmission signals, or at least the portion that originates from in-range transmitters 115. According to the present invention, the PMU 105 is able to associate the received transmission signals with the transmitters 115 that sent the transmission signals, such as by storing a listing of transmitter identification information (IDs) and frequencies associated therewith. The IDs can be programmed, for instance, manually by a service provider or by over-the-air programming.

The transmission signals that are provided by the transmitters 115 need only be separable by receiving PMUs 105 from other communications within the system 100. Preferably, the transmission signals comprise orthogonal signals, such as tones. The transmission signals will hereinafter be referred to as tones, although other signal types can be alternatively utilized.

Bandwidths and frequency intervals for the tones can be varied to suit system needs. By way of example, the frequency tones sent by the transmitters 115 could be located in a frequency bandwidth of 6.25 kilohertz (kHz) and separated by 150 Hz intervals. Therefore, according to the example, twenty-nine (29) tones would fit within a 6.25 kHz bandwidth. The number of tones can be doubled through time reuse. For instance, a first set of transmitters 115 including twenty-eight (28) transmitters 115 could transmit tones during one set of frames of the radio signal, while a second set of transmitters 115 including another twenty-eight (28) transmitters 115 could use another set of frames. By way of example, the two sets could be chosen to correspond to odd-numbered and even-numbered frames. When the number of transmitters 115 within the system 100, or within any particular zone of the system 100, exceeds fifty-six (56), tones can be reused if necessary.

According to a first embodiment of the present invention, the PMU 105 receives tones from the transmitters 115 and measures the power, i.e., the signal strength, of each received tone. The powers, in decibels, are provided directly to the RFC 110 for calculation thereby of carrier-to-interference (C/I) values associated with the PMU 105. The C/I values are indicative of relative strengths of the tones provided by the transmitters 115 and are preferably calculated not only for each transmitter, but also for each possible transmitter grouping, i.e., each possible reuse factor. The RFC 110 then determines from the C/I values which particular transmitter 115 and which particular reuse factor are to be used for transmission of a message to the PMU 105. The PMU 105 can then, for example, be instructed as to which frequency will be used to transmit its messages. Alternatively, the PMU 105 can scan to locate the proper frequency associated with the transmitter 115 selected to transmit messages to the PMU 105. When transmitters 115 within the system 100 are able to transmit on different frequencies, the RFC 110 preferably also indicates to the selected transmitter 115 which frequency is to be used for transmission.

According to a second embodiment of the present invention, the PMU 105 computes the C/I values from the received tones. The C/I values are then sent by the PMU 105 to the RFC 110 so that the RFC 110 can determine a reuse factor, e.g., three, five, seven, etc., that is indicative of the particular number of transmitters included in a reuse group and that is used for determining which transmitter 115 is to be used to transmit a message to the PMU 105. These two embodiments will be explained in greater detail below.

Figure 4:
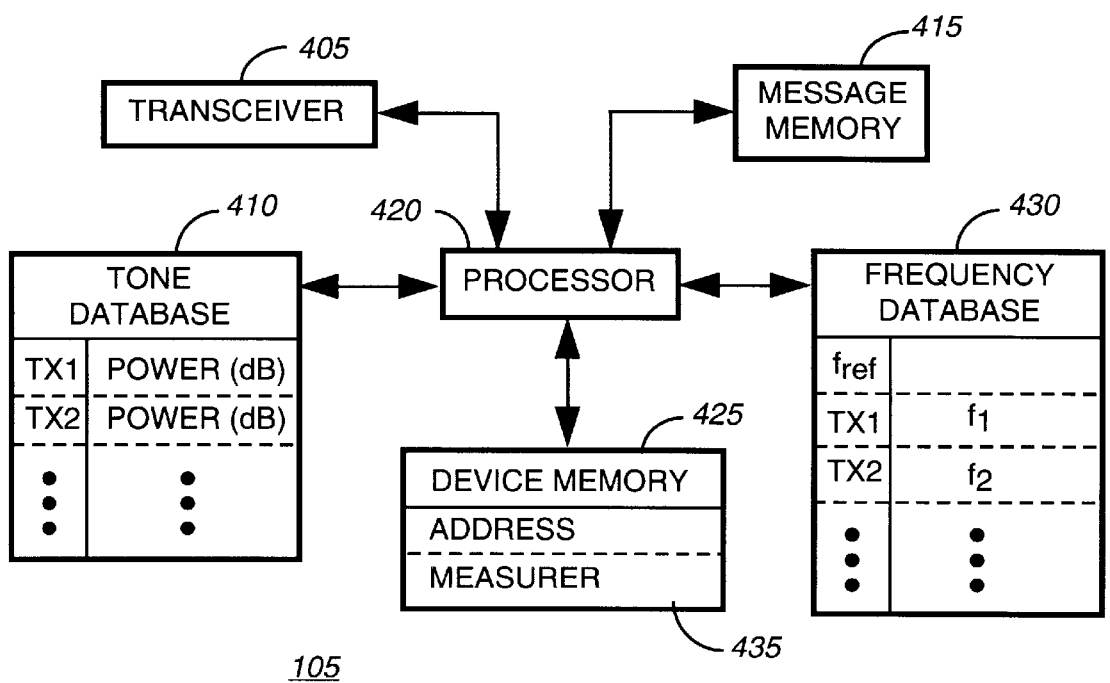
FIG. 4 is an electrical block diagram of a portable messaging unit (PMU) for providing signal strengths of received tones to a controller included in the communication system of FIG. 1 according to the present invention.

FIG. 4 is an electrical block diagram of a PMU 105 in accordance with the present invention. The PMU 105 includes a transceiver 405 for receiving tones transmitted by the transmitters 115 (FIG. 1) and messages intended for reception by the PMU 105. The tones and messages are processed by a processor 420 coupled to the transceiver 405 for controlling operations of the PMU 105. A message memory 415 stores the messages, a frequency database 430 stores an indication of a reference frequency and frequencies at which tones are transmitted by the different transmitters 115, and a tone database 410 stores power measurements for received tones and transmitter IDs of transmitters 115 associated therewith. A device memory 425 stores an address associated with the PMU 105, and a measurer 435 measures signal strengths of the received tones. The measurer 435 can be, for example, implemented in firmware stored in the device memory 425 and executed by the processor 420.

Figure 5:
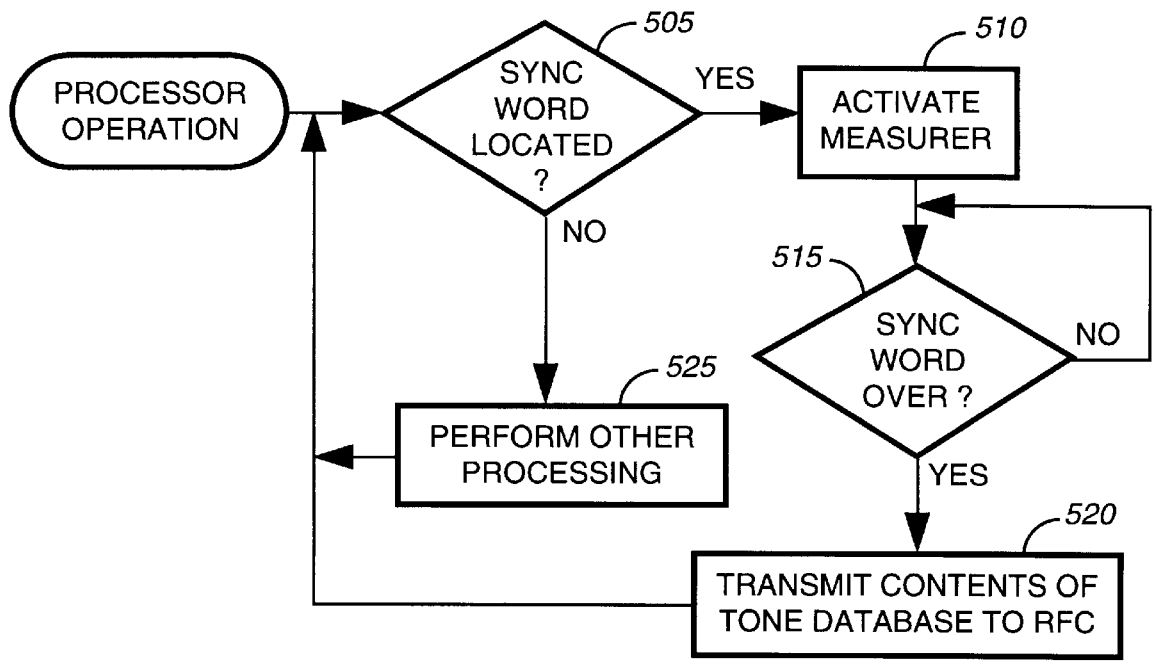
FIG. 5 is a flowchart of an operation of a processor included in the PMU of FIG. 4 according to the present invention.

FIG. 5 is a flowchart illustrating an operation of the processor 420 according to the present invention. When, at step 505, the processor 420 recognizes the synchronization word of the received radio signal, the measurer 435 is activated, at step 510. When, at step 515, the synchronization word is over, the contents of the tone database 410 (FIG. 4) are provided to the RFC 110 (FIG. 1) via the transceiver 405. When, at step 635, reference to the frequency database 430 indicates that further tones are to be located, processing continues at step 615. Otherwise, the measurer 435 awaits reactivation by the processor 420, in which case processing continues at step 605.

Figure 6:
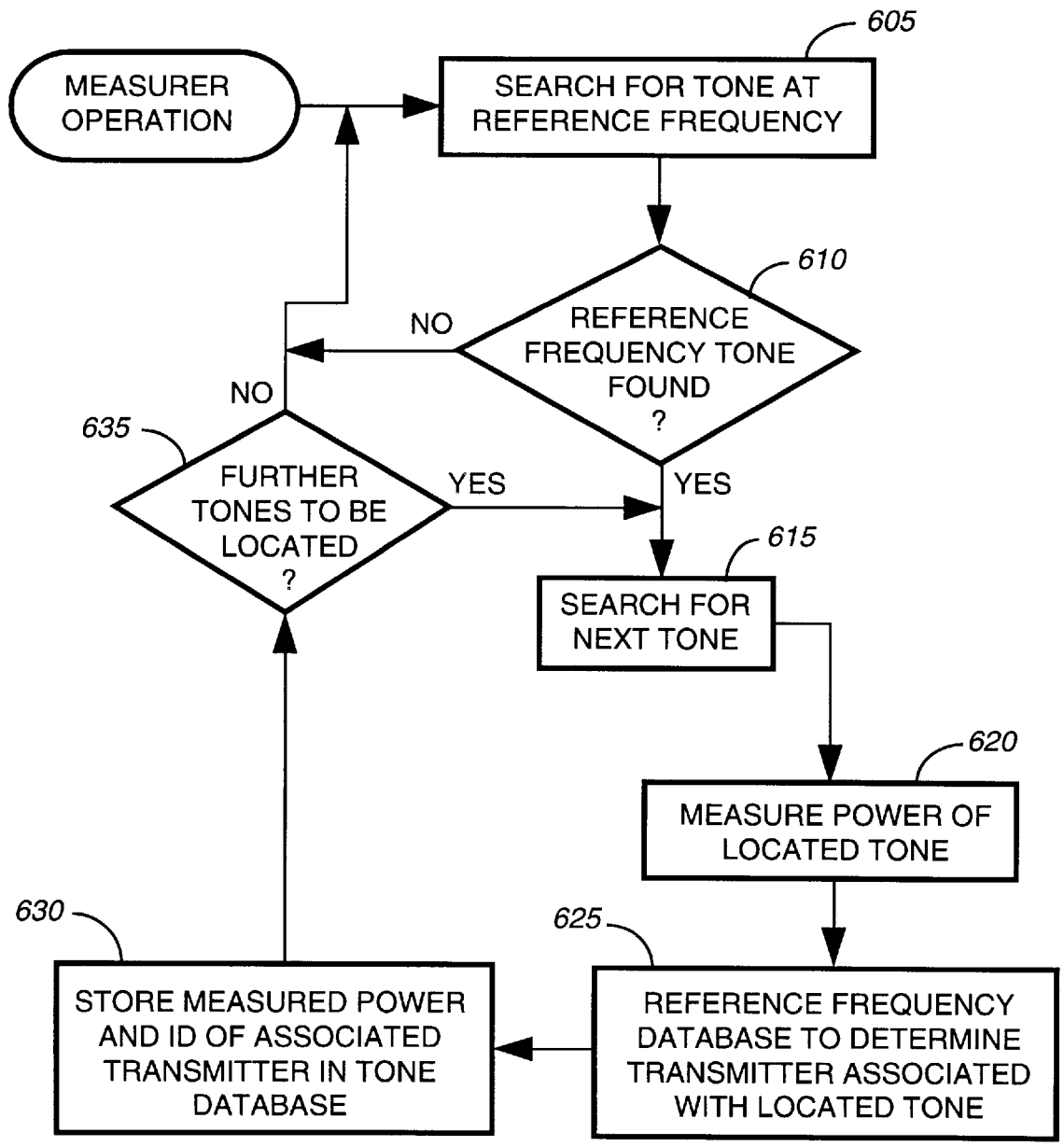
FIG. 6 is a flowchart of an operation of a measurer included in the PMU of FIG. 4 according to the present invention.

FIG. 6 is a flowchart of an operation of the measurer 435 which, at step 605, searches for a tone at the reference frequency. When, at step 610, the reference frequency tone is found, the measurer 435 attempts to locate a next tone, at step 615. Thereafter, the power of the next located tone is measured, at step 620, in a conventional manner. The frequency database 430 is then referenced, at step 625, to determine which of the transmitters 115 is associated with the located tone, and an appropriate entry of the transmitter ID and signal strength is made in the tone database 410, at step 630.

Figure 7:
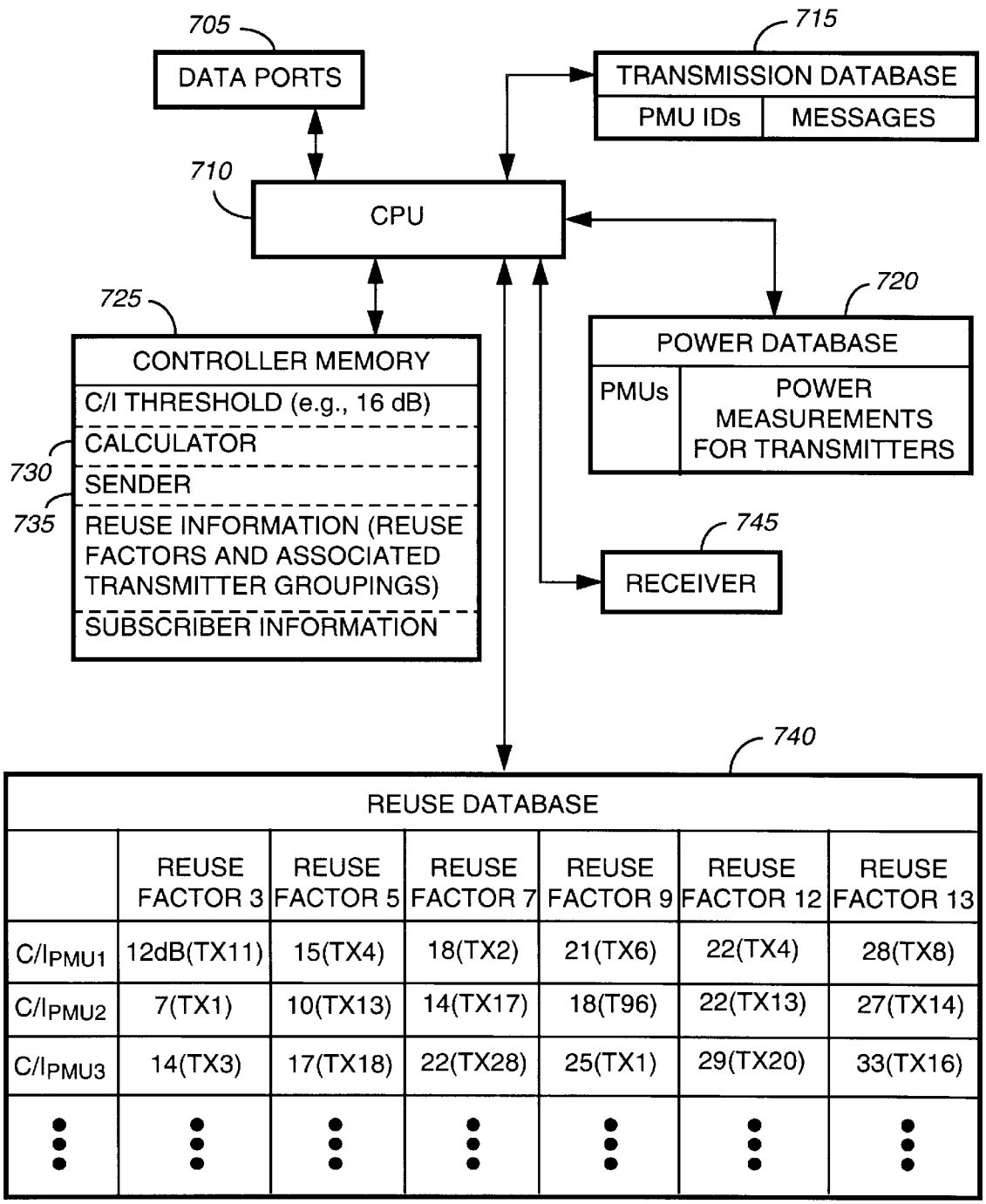
FIG. 7 is an electrical block diagram of a controller included in the communication system of FIG. 1 for calculating C/I values and grouping transmitters into reuse groups according to the present invention.

Referring next to FIG. 7, an electrical block diagram of an RFC 110 according to the present invention is shown. The RFC 110 includes a receiver 745 for receiving the contents of the tone database 410 from the PMU 105, data ports 705 for coupling to the transmitters 115, and a central processing unit (CPU) 710 for controlling operations of the RFC 110. The data ports 705 can also be coupled to a telephone network (not shown) for receiving messages intended for reception by PMUs 105 within the system 100 (FIG. 1).

A transmission database 715 is coupled to the CPU 710 for storing messages intended for reception by PMUs 105, and a power database 720 is coupled to the CPU 710 for storing the power measurements, i.e., signal strengths, returned to the RFC 110 by the different PMUs 105 in the system 100. A controller memory 725 stores system parameters and system information, such as subscriber information, a C/I threshold value indicative of a calculated value for which messages are likely to be received properly by recipient PMUs 105, and reuse information that includes different reuse factors. When the transmitters associated with each reuse group are fixed, the reuse information further includes transmitter groupings associated with each reuse group. The reuse information could include, for instance, an indication that TX9, TX10, TX12, TX13, TX14, TX15, and TX24 form a single reuse group 310 (FIG. 3) when the reuse factor equals seven. When the composition of the reuse groups can be varied, though, this information would be unnecessary.

The RFC 110 also includes a calculator 730 for calculating, for each PMU 105 that returned signal strengths of tones, C/I values indicative of relative signal strength for each transmitter 115 and for each reuse group. A sender 735 dynamically groups transmitters into appropriate reuse groups for transmission of messages in the system 100. A reuse database 740 is coupled to the CPU 710 for storing the C/I values calculated by the calculator 730. Preferably, the calculator 730 and the sender 735 are implemented in firmware stored in the controller memory 725 and executed by the CPU 710. Alternatively, hardware capable of performing equivalent operations can be used.

According to the present invention, the RFC 110 receives signal strengths from the PMUs 105 and calculates therefrom C/I values for each reuse factor utilized in the system 100. By way of example, when the reuse factors are three, five, seven, nine, twelve, and thirteen (as shown), C/I values are calculated for each PMU 105 for a transmitter reuse group that includes three transmitters 115, then for a transmitter reuse group that includes five transmitters 115, and so on, as explained in greater detail below. Additionally, as mentioned above, the transmitters 115 included in each reuse group are not necessarily fixed. Therefore, C/I values can be calculated not only for different reuse factors but also, for each reuse factor, different combinations of transmitters 115.

Once the reuse database 740 has been completed, the RFC 110 determines, for each PMU 105 awaiting message delivery, which reuse factor yields a lowest C/I value that still exceeds the C/I threshold value stored in the controller memory 725. When, for instance, the C/I threshold value equals sixteen decibels (dB), a reuse factor of seven is chosen for message delivery to a first PMU 105, e.g., PMU1, and a particular transmitter, e.g., TX2, in one of the seven-cell reuse groups is chosen to transmit the message to PMU1. Similarly, a reuse factor of five is chosen for message delivery to another PMU 105, e.g., PMU3, and another transmitter, e.g., TX18, in one of the five-cell reuse groups is chosen to transmit the message to PMU3. After determining which reuse factor and which transmitter 115 optimize the message delivery process for each PMU 105 intended to receive a message, the RFC 110 then groups together all outgoing messages having equivalent reuse factors for transmission during different time periods using different reuse groups. In this manner, the transmitters 115 can be dynamically grouped for message delivery while still optimizing the C/I values to ensure proper message delivery.

For illustrative purposes only, FIG. 7 shows a simplified reuse database 740 that includes only the C/I values and selected transmitter 115 for each reuse factor. It will be appreciated, however, that additional information will be included for systems in which the particular transmitters included in reuse groups vary. By way of example, a more complex reuse database could, in reality, also include an indication of which transmitters 115 will be combined into a reuse group with the selected transmitter 115 for each reuse factor entry in the database. In the reuse database 740 of FIG. 7, for instance, the entry associated with PMU1 and with a reuse factor of three (3) could also designate that the selected reuse group would include TX11, TX13, and TX14. For purposes of simplicity, however, the system 100 will be described below as if the transmitters 115 included within each reuse group are fixed.

Figure 8:
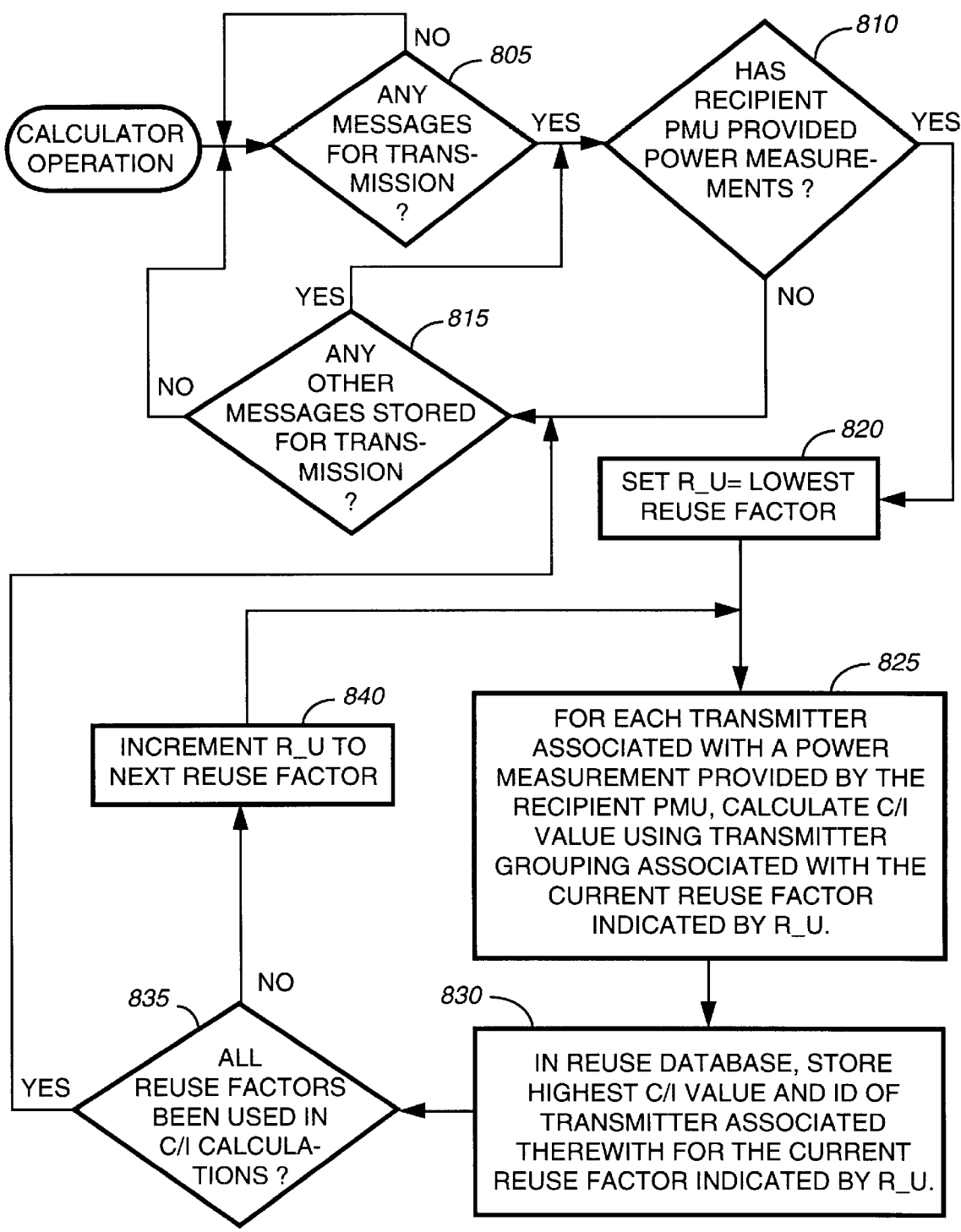
FIG. 8 is a flowchart depicting an operation of a calculator included in the controller of FIG. 7 according to the present invention.

Referring next to FIG. 8, a flowchart illustrates an operation of the calculator 730 in accordance with the present invention. When, at steps 805, 810, messages are stored in the transmission database 715 for transmission, but a recipient PMU 105 has not provided power measurements, the message for that particular PMU 105 is held until a later time when power measurements have been received from the PMU 105.

When, at steps 805, 810, there are messages for transmission and a recipient PMU 105 has provided power measurements, a variable R__U (indicative of "reuse factor") is set, at step 820, to equal the lowest reuse factor indicated by the reuse information stored in the controller memory 725. Then, at step 825, for each transmitter associated with a power measurement provided by the recipient PMU, the C/I value is calculated using the particular transmitter grouping associated with R__U. Specifically, the C/I value for a particular transmitter 115 is calculated by summing the signal strengths of the tones transmitted by all corresponding transmitters 115 within the system 100. Corresponding transmitters 115 are those transmitters 115 that are to transmit on the same channel as the particular transmitter 115 but that are in different reuse groups. The signal strength of the tone transmitted by the particular transmitter 115 is then divided by the sum. This process is given by the following formula:

$$C/I_{PMUn} = \text{strength}_{transmitter\ m} / \Sigma(\text{strength}_{corresponding\ transmitters}). \quad (1)$$

The following example operates on the assumptions that TX1, TX5, TX9, TX12, TX14, TX18, and TX12 are corresponding transmitters that transmit on the same channel in different reuse groups and that PMU1 received tones from TX1, TX5, TX9, TX12, TX14, TX18, and TX12. Given these assumptions and referring to FIG. 2 in conjunction with FIG. 8, when R__U=3, the C/I value for TX1 with respect to PMU1 is given by the following formula:

$$C/I_{PMU1} = \text{strength}_{TX1}/(\text{strength}_{TX5} + \text{strength}_{TX9} + \text{strength}_{TX12} + \text{strength}_{TX14} + \text{strength}_{TX18} + \text{strength}_{TX21}). \quad (2)$$

The next example assumes that TX3, TX13, TX18, and TX25 are corresponding transmitters in different reuse groups and that PMU1 received tones from TX3, TX13, TX18, and TX25. Referring to FIG. 3 in conjunction with FIG. 8, when R__U=7 (FIG. 3), the C/I value for TX13 with respect to PMU1 is given by the following formula:

$$C/I_{PMU1} = \text{strength}_{TX13}/(\text{strength}_{TX3} + \text{strength}_{TX18} + \text{strength}_{TX25}). \quad (3)$$

In both of the above examples, it will be appreciated that corresponding transmitters providing tones that were not received by the PMU 105 will not be included in the denominator sum. Furthermore, when the system 100 includes a greater number of reuse groups than shown in FIGS. 2 and 3, the denominator sum would account for additional corresponding transmitters as long as the PMU 105 received the tones transmitted thereby.

Returning to FIG. 8, once all C/I values have been calculated for all transmitters 115 with respect to the recipient PMU 105 and with respect to the current setting of R__U, the highest C/I value and the ID of the transmitter associated therewith is stored, at step 830, in the reuse database 740 for the current reuse factor, as indicated by R__U. As mentioned above, the reuse database 740 could further indicate which transmitters 115 are included in each reuse group when the particular transmitters within each reuse group can be varied within the system 100.

When, at step 835, all of the reuse factors have not been considered in calculating C/I values for the recipient PMU 105, R__U is incremented, at step 840, to the next reuse factor. For instance, in the reuse database 740 (FIG. 7), R__U would be incremented from three to five. Processing then continues at step 825 to calculate, for the next value of R__U, C/I values for all transmitters 115 with respect to the recipient PMU 105.

When, at step 835, all reuse factors have been considered in calculating C/I values for the recipient PMU 105, the transmission database 715 is referenced, at step 815, to determine whether any messages for transmission to other PMUs 105 are stored. When so, processing continues at step 810. In this manner, the calculator 730 fills, for each recipient PMU 105, the reuse database 740 with the most favorable C/I values and transmitter IDs associated therewith for each reuse factor.

It will be appreciated that less elaborate communication systems could always operate in a fixed reuse pattern, in which case messages for PMUs associated with insufficiently low C/I values could be held until a later time when higher C/I values are calculated. Alternatively, different reuse factors could be available but unused by a system under certain circumstances, such as when some transmitters are unavailable for use.

Figure 9:
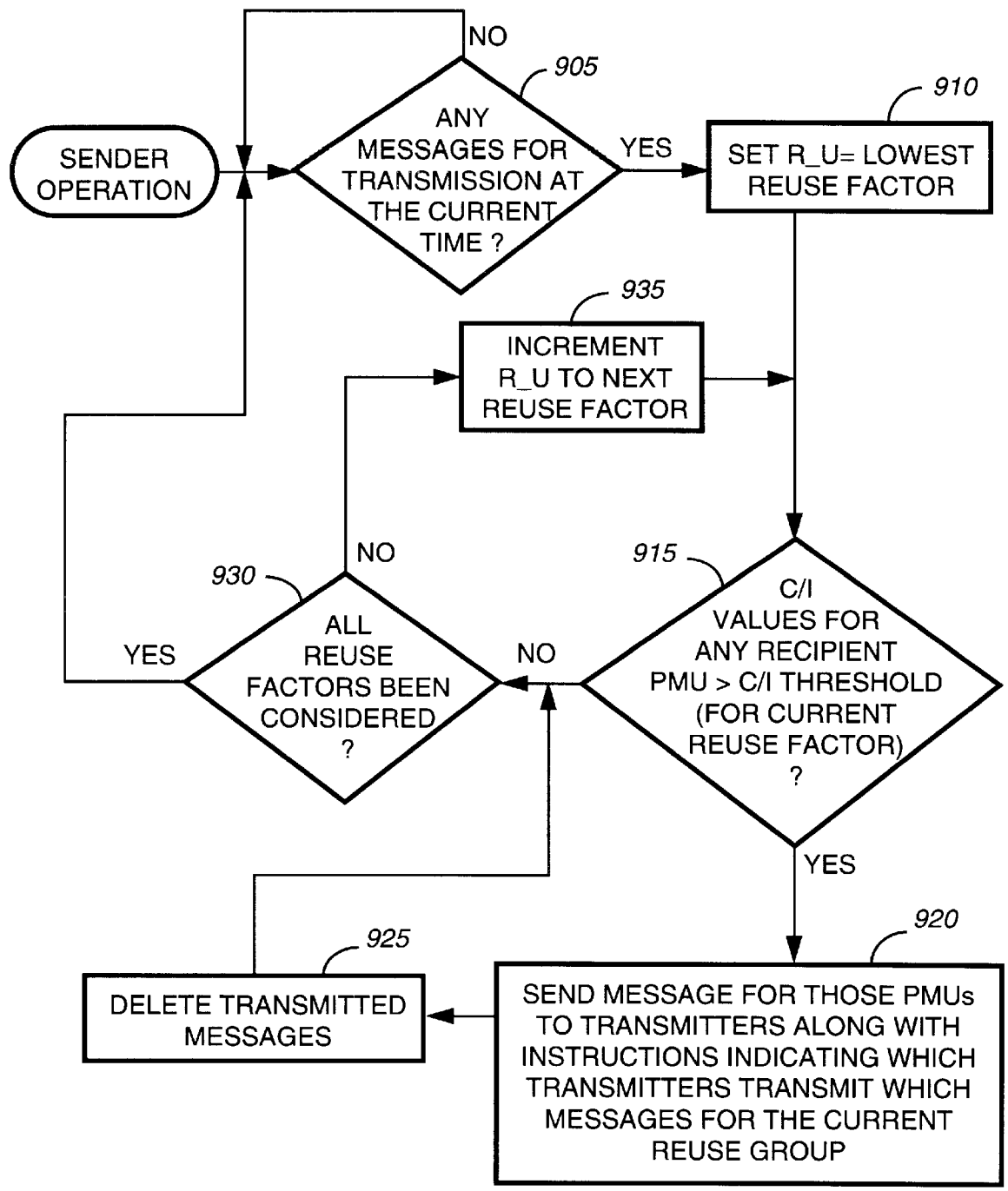
FIG. 9 is a flowchart of an operation of a sender included in the controller of FIG. 7 according to the present invention.

Referring next to FIG. 9, a flowchart depicts an operation of the sender 735 (FIG. 7) according to the present invention. When, at step 905, messages are to be transmitted at the current time, e.g., when a frame corresponding to a home frame of a PMU 105 has arrived, the variable R_U is set, at step 910, to the lowest reuse factor, as indicated by the reuse information stored in the controller memory 725. Then, at step 915, when the C/I values for any recipient PMUs 105 exceed the C/I threshold value stored in the controller memory 725, the messages for those recipient PMUs 105 are gathered and provided, at step 920, to the transmitters 115 for transmission thereby. Specifically, the RFC 110 provides instructions for grouping the transmitters 115 in the system 100 into reuse groups in accordance with the reuse factor associated with the current value of R_U. Additionally, each message to be transmitted using the reuse factor associated with the current value of R_U is provided to the transmitter 115 specified in the reuse database 740 (FIG. 7), i.e., the transmitter 115 that has been previously determined to yield the highest C/I value for the particular reuse group. Thereafter, the messages provided to the transmitters 115 can be deleted, at step 925, from the transmission database 715 or marked as having been transmitted.

When, at step 915, no C/I values in the database 740 exceed the C/I threshold value for the reuse factor indicated by R_U, and all reuse factors have been considered, at step 930, the sender 735 awaits activation at a later time when processing continues at step 905. When, at step 930, all reuse factors have not yet been considered, the variable R_U is incremented, at step 935, to the next reuse factor, and processing continues at step 915.

As described in FIGS. 4–9, the PMU 105 calculates signal strengths of the received tones and returns the signal strengths to the RFC 110 for calculation of the C/I values. Based on the C/I values, the RFC 110 can then determine, for each message to be transmitted, the minimum number of transmitters that can be grouped into reuse groups while still ensuring delivery of a message that can be decoded without errors by the PMU 105. Furthermore, the RFC 110 can advantageously vary the number of transmitters in reuse groups for delivery of different messages. As a result, transmission resources are also efficiently utilized, since no message is transmitted using any higher reuse factor than necessary. Messages can therefore be provided without the delays and without the erroneous or missed messages that are often present in conventional messaging systems.

Additionally, the C/I values can be advantageously used for purposes other than grouping of the transmitters 115 into reuse groups. For instance, data rate could be varied based upon the C/I values so that PMUs 105 reporting high C/I values could receive messages at higher channel speeds, thereby further reducing system backlogs and delays. When C/I values for a PMU 105 are sufficiently high, error correction could even be eliminated to reduce message length.

It will be appreciated by one of ordinary skill in the art that, when the RFC 110 knows the system layout and transmitter characteristics, the RFC 110 need not group the transmitters 115 into groups based on fixed reuse factors at all. Instead, transmitters 115 can be selected and/or grouped as necessary depending upon PMU locations and reported power measurements, from which the C/I values are calculated by the RFC 110. By way of example, reference to calculated C/I values for recipient PMUs 105 might reveal that transmission by selected transmitters 105, with other transmitters 115 turned off, adequately guarantees message delivery at a particular time, even without the formation of reuse groups within the communication system 100. Alternatively, reuse groups could be formed using clusters of differing numbers of transmitters 115. For instance, at one area within the system 100, a reuse group could be formed by three transmitters 115 while, at another area, a reuse group could be formed by seven transmitters 115, with both reuse groups transmitting at the same time.

Even in embodiments in which reuse groups of fixed numbers of transmitters 115 are used, reuse factors do not necessarily have to be preprogrammed into the RFC 110. Instead, the RFC 110 can group the transmitters 115 into reuse groups defined by any feasible reuse factor. For example, rather than using set reuse factors of 3, 5, 7, 9, 12, and 13 (as shown in FIG. 7), the RFC 110 could calculate C/I values for reuse factors of 1, 2, 3, 4, 5, . . . and so on until one of the reuse factors yields a C/I value that exceeds the C/I threshold. In this manner, transmission of messages could be accomplished efficiently and quickly without jeopardizing reliability.

Figure 10:
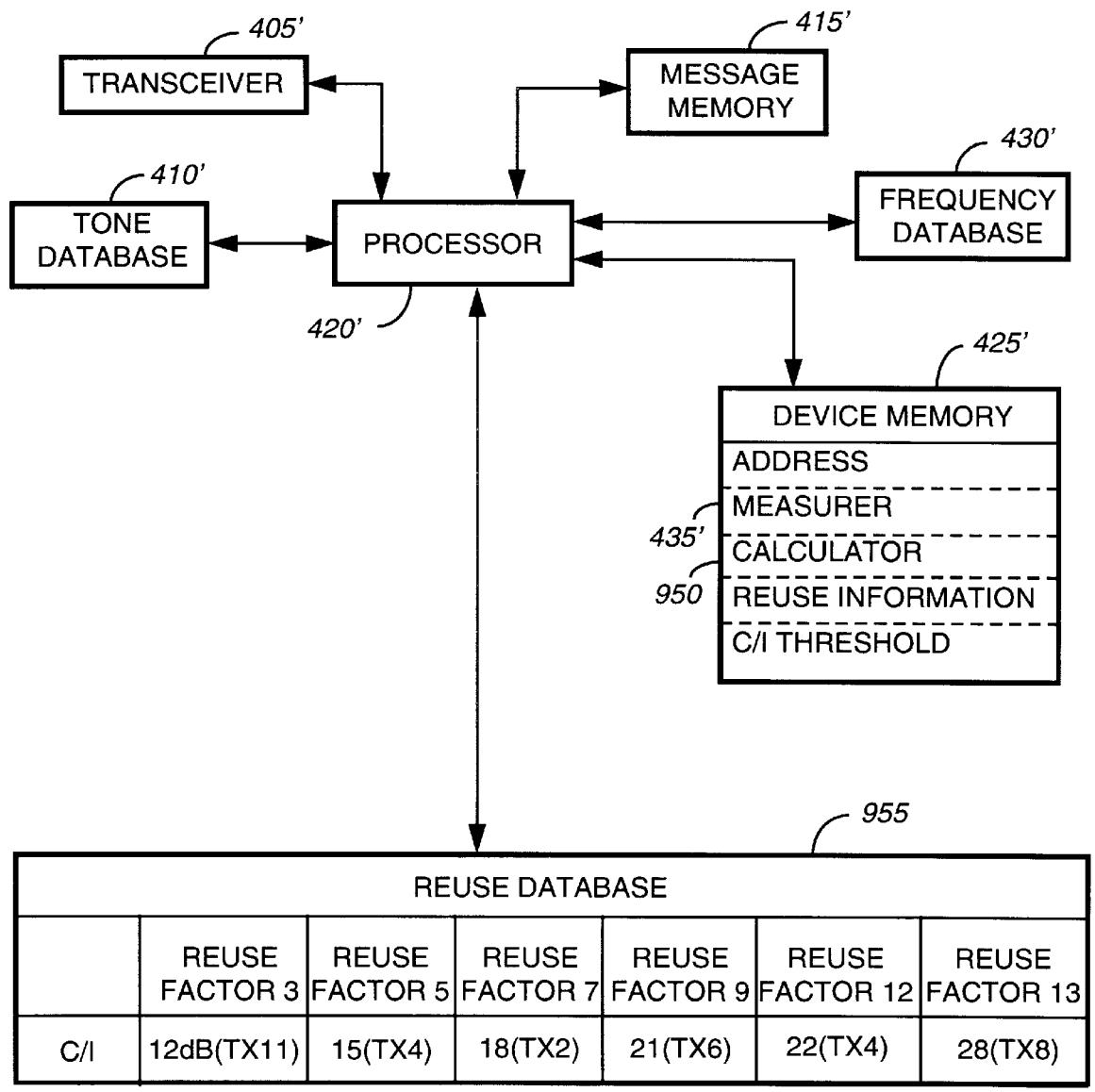
FIG. 10 is an electrical block diagram of a PMU included in the communication system of FIG. 1 for calculating C/I values and providing an indication of transmitter groupings to the controller according to the present invention.

FIG. 10 is an electrical block diagram of a PMU 105' that can be utilized in accordance with still another embodiment of the present invention. The PMU 105' utilizes a transceiver 405', a message memory 415', a frequency database 430', a measurer 435', a tone database 410', a device memory 425', and a processor 420' for performing operations similar to those performed by the PMU 105 of FIG. 4. Additionally, the PMU 105' includes a calculator 950, which can be implemented in firmware, for calculating the C/I values for each reuse factor from the signal strengths of the received tones. A reuse database 955 then stores the C/I values. Preferably, the device memory 425' of the PMU 105' includes the C/I threshold value and reuse information equivalent to that stored by the RFC 110 of FIG. 7. However, it will be appreciated that, in this embodiment of the present invention, the particular transmitters included in each reuse group should be fixed for each reuse factor.

According to this embodiment of the present invention, the calculator 950, for each reuse factor, computes the C/I values for the different transmitters 115 and determines which transmitter 115 yields the highest C/I value in a manner similar to that described with reference to FIG. 8. That C/I value and the ID of the particular transmitter 115 are then stored in the reuse database 955. Preferably, the processor 420' references the stored C/I values to determine the lowest C/I value that exceeds the C/I threshold value and then activates the transceiver 405' to transmit the selected reuse factor and transmitter ID to the RFC 110. In this way, the PMU 105' need only send a small amount of information; transmission of the entire contents of the tone database 410' is unnecessary. As a result, less power and less time are required for transmission of the necessary information to the RFC 110.

In summary, the communication system as described above includes a radio frequency controller (RFC) for controlling the system, portable messaging units (PMUs) for receiving messages, and transmitters for transmitting the messages to the PMUs. According to the present invention, the transmitters send out tones that are received by the PMUs, which subsequently calculate signal strengths of the received tones and transmit the signal strengths and associated transmitter IDs to the RFC. The RFC then calculates relative signal strengths, i.e., C/I values, of the tones received by the different PMUs for reuse factors associated with different reuse groups into which the transmitters can be grouped for message transmission. The C/I values are compared to a threshold value to determine, for each PMU intended to receive a message, which of several possible reuse groups will efficiently utilize system resources while maintaining messaging reliability. Thereafter, the messages to be transmitted are grouped according to reuse factors, and the RFC sends out the messages to be transmitted using different reuse groups during different time periods, respectively.

By way of example, when a first PMU sends a first signal indicative of first signal strengths, the RFC can calculate first C/I values associated with the first PMU. Then, a message to the first PMU can be transmitted during a first time period using a first selected transmitter determined from the first C/I values and included in a first reuse group characterized by a cluster of a first number of transmitters, i.e., a first reuse factor. When a second PMU sends a second signal indicative of second signal strengths, the RFC can calculate second C/I values associated with the second PMU. Subsequently, during a second time period, a message to a different PMU can be transmitted using a second selected transmitter determined from the second C/I values and included in a second reuse group characterized by a cluster of a second number of transmitters, i.e., a second reuse factor. In this manner, system performance can be optimized by dynamically altering reuse groups of transmitters based on the calculated C/I values.

Alternatively, each PMU could itself calculate its C/I values for each reuse group, then provide the RFC with a signal indicating the reuse group and the selected transmitter that are most appropriate for message transmission. This embodiment would require less time and less power for transmission of information from the PMU to the RFC.

Another advantages of calculating the C/I values is that data rate could be varied based upon the C/I values so that PMUs 105 reporting high C/I values could receive messages at higher channel speeds, thereby speeding up message transmission. Also, error correction could be eliminated for PMUs 105 with sufficiently high C/I values.

It will be appreciated by now that there has been provided a way to optimize signal quality and efficiently utilize system resources.

What is claimed is:

1. A method for dynamically selecting transmitters for message transmission in a communication system, the method comprising the steps of:

sending, at a known time and carrier frequency, transmission signals from the transmitters;

calculating carrier-to-interference (C/I) values indicative of relative strengths of the transmission signals as received at the known time and carrier frequency by a portable messaging unit (PMU) included in the communication system; and determining, prior to message delivery, a selected transmitter for transmitting a message to the PMU, the selected transmitter associated with a lowest C/I value that is chosen from the C/I values and that exceeds a C/I threshold value.

2. The method of claim 1, wherein the calculating step comprises the step of:

computing a C/I value associated with a particular transmitter by dividing a signal strength of a transmission signal transmitted by the particular transmitter with a sum of signal strengths of transmission signals transmitted by other transmitters not including the particular transmitter.

3. The method of claim 1, further comprising the steps of:

calculating different C/I values indicative of relative strengths of the transmission signals received by a different PMU; and determining, prior to message delivery, a second selected transmitter for transmitting a second message to the different PMU, the second selected transmitter associated with a lowest C/I value that is chosen from the different C/I values and that exceeds the C/I threshold value.

4. The method of claim 3, further comprising:

grouping, during a first time period, the transmitters into first reuse groups, each including a number of transmitters defined by a first reuse factor, in accordance with the lowest C/I value chosen from the C/I values;

transmitting the message to the PMU during the first time period;

grouping, during a second time period, the transmitters into second reuse groups, each including a number of transmitters defined by a second reuse factor, in accordance with the lowest C/I value chosen from the different C/I values; and transmitting the second message to the different PMU during the second time period, wherein, when the first and second reuse factors are different, the second time period is different from the first time period.

5. The method of claim 4, wherein the calculating step comprises the step of:

computing C/I values associated with a particular transmitter included in a cluster of transmitters defined by a particular reuse factor by dividing a signal strength of a transmission signal transmitted by the particular transmitter with a sum of signal strengths of transmission signals transmitted by other transmitters included within other clusters of transmitters defined by the particular reuse factor.

6. The method of claim 1, wherein the calculating step comprises the steps of:

the PMU calculating signal strengths of the transmission signals;

the PMU transmitting a signal indicative of the signal strengths to a controller included in the communication system;

the controller computing the C/I values; and the controller determining the selected transmitter.

7. The method of claim 1, wherein the calculating step comprises the steps of:

the PMU calculating signal strengths of the transmission signals;

the PMU computing the C/I values;

the PMU determining the selected transmitter; and the PMU transmitting a signal indicative of the selected transmitter to a controller included in the communication system.

8. A communication system for dynamically selecting transmitters for message transmission, the communication system comprising:

the transmitters for sending, at a known time and carrier frequency, transmission signals;

a portable messaging unit (PMU) for receiving at the known time and carrier frequency the transmission signals, calculating signal strengths of the transmission signals, and transmitting a signal indicative of the signal strengths; and a controller for receiving the signal, determining therefrom carrier-to-interference (C/I) values indicative of relative strengths of the transmission signals received by the PMU prior to message delivery to the PMU, and determining a selected transmitter for transmitting a message to the PMU, the selected transmitter associated with a lowest C/I value that is chosen from the C/I values and that exceeds a C/I threshold value.

9. The communication system of claim 8, wherein the PMU comprises:

a transceiver for receiving the transmission signals and sending the signal;

a frequency database coupled to the transceiver for storing frequencies at which the transmitters transmit the transmission signals;

a measurer coupled to the frequency database for calculating the signal strengths of the transmission signals at the frequencies; and a tone database coupled to the measurer for storing the signal strengths of the transmission signals.

10. The communication system of claim 8, wherein the controller comprises:

a receiver for receiving the signal from the PMU;

a power database coupled to the receiver for storing the signal strengths of the transmission signals transmitted by the transmitters;

a calculator coupled to the power database for computing the C/I values for the transmitters;

a memory for storing the C/I threshold value; and a sender coupled to the memory and the calculator for choosing the selected transmitter.

11. The communication system of claim 8, wherein the controller comprises:

a receiver for receiving another signal indicative of signal strengths of transmission signals received by a different PMU;

a calculator coupled to the receiver for computing different C/I values indicative of relative strengths of the transmission signals received by the different PMU; and a sender for selecting a second selected transmitter for transmitting a second message to the different PM, the second selected transmitter associated with a lowest C/I value that is chosen from the different C/I values and that exceeds the C/I threshold value.

12. The communication system of claim 11, wherein the controller further comprises:

data ports coupled to the transmitters for providing the message to the selected transmitter and the second message to the second selected transmitter.

13. The communication system of claim 11, wherein the controller further comprises:

data ports coupled to the transmitters for grouping, during a first time period, the transmitters into first reuse groups, each including a number of transmitters defined by a first reuse factor, in accordance with the lowest C/I value chosen from the C/I values, and for grouping, during a second time period, the transmitters into second reuse groups, each including a number of transmitters defined by a second reuse factor, in accordance with the lowest C/I value chosen from the different C/I values, wherein the message is transmitted to the PMU during the first time period and the second message is transmitted to the different PMU during the second time period, and wherein, when the first and second reuse factors are different, the second time period is different from the first time period.

14. A portable messaging unit (PMU) for receiving signals, the PMU comprising:

a transceiver for receiving, at a known time and carrier frequency, transmission signals transmitted by transmitters;

calculating means coupled to the transceiver for calculating carrier-to-interference (C/I) values indicative of relative strengths of the transmission signals; and determining means coupled to the calculating means for determining, prior to message delivery to the PMU, a selected transmitter for transmitting a message to the PMU, the selected transmitter associated with a lowest C/I value that is chosen from the C/I values and that exceeds a C/I threshold value, wherein the transceiver transmits a signal indicative of the selected transmitter for subsequent use in transmitting the message to the PMU.

15. The PMU of claim 14, wherein the calculating means comprises:

a measurer for calculating signal strengths of the transmission signals; and a calculator coupled to the measurer for computing the C/I values from the signal strengths.

16. The PMU of claim 15, wherein the determining means comprises a processor for comparing the C/I values to the C/I threshold value to determine the selected transmitter.

17. The PMU of claim 16, further comprising:

a device memory coupled to the processor for storing the C/I threshold value.

18. The PMU of claim 16, further comprising:

a frequency database coupled to the processor for storing frequencies at which the transmission signals are transmitted;

a tone database coupled to the processor for storing the signal strengths of the transmission signals; and a reuse database coupled to the processor for storing the C/I values calculated by the calculator.

19. The PMU of claim 16, wherein the PMU is included in a communication system comprising:

the transmitters for transmitting the transmission signals and the message; and a controller coupled to the transmitters for receiving the signal from the PMU and for providing the message to the selected transmitter indicated in the signal.

20. A controller for dynamically grouping transmitters for message transmission to portable messaging units (PMUs), the controller comprising:

a receiver for receiving a first signal indicative of first signal strengths of transmission signals received by a first PMU and a second signal indicative of second signal strengths of transmission signals received by a second PMU;

a calculator coupled to the receiver for computing first carrier-to-interference (C/I) values indicative of relative strengths of the transmission signals received by the first PMU and for computing second C/I values indicative of relative strengths of the transmission signals received by the second PMU; and a sender coupled to the calculator for determining, from the first C/I values and prior to message delivery to the first and second PMUs, a first selected transmitter and a first reuse factor for transmitting a first message to the first PMU, the first reuse factor included in a number of reuse factors used by the controller for grouping the transmitters for message delivery, and for determining, from the second C/I values, a second selected transmitter and a second reuse factor for transmitting a second message to the second PMU, the second reuse factor also included in the number of reuse factors.

21. The controller of claim 20, further comprising:

data ports for grouping, when the first reuse factor and the second reuse factor are different, the transmitters into a first reuse group to transmit the first message during a first time period and for grouping the transmitters into a second reuse group to transmit the second message during a second time period different from the first time period.

22. The controller of claim 20, further comprising:

a memory for storing a C/I threshold value, wherein the sender selects the first reuse factor in accordance with a lowest of the first C/I values that exceeds the C/I threshold value and the second reuse factor in accordance with a lowest of the second C/I values that exceeds the C/I threshold value.

* * * * *